Oct. 24, 1933.    J. T. ANDERSON    1,931,685

TRAILER FOR TRICYCLES AND THE LIKE

Filed Aug. 14, 1931

Jason T. Anderson
Inventor

Thomas Bilyeu
Attorney

Patented Oct. 24, 1933

1,931,685

UNITED STATES PATENT OFFICE 1,931,685

TRAILER FOR TRICYCLES AND THE LIKE

Jason T. Anderson, Harrisburg, Oreg.

Application August 14, 1931. Serial No. 557,123

2 Claims. (Cl. 208—45)

My invention relates to tricycles, velocipedes and the like, and consists of a body wheel supported structure adapted for placement and for being detachably secured to the velocipede. Articles to be conveyed may be placed within the trailer being supported thereby on one end and being drawn at the rear thereof as the manually driven unit is operated.

The device consists primarily of a body element having a bracket downwardly extending therefrom into which an axle is supported. Wheels are disposed upon the oppositely disposed ends of the axles for supporting the axle and the superposed structure. At the front of the vehicle a bifurcated yoke extends downwardly being rotatably secured relative to the body element by a king bolt. Means being associated with the yoke for removably attaching the same to the frame of the tricycle. The lower end of the yoke members being also bifurcated to facilitate its placement upon the rear axle of the tricycle.

The object of my invention is to make a trailer available for attachment to a manually operated tricycle, velocipede and the like, so that articles to be conveyed may be carried within the trailer.

A further object of my invention consists in providing a simply constructed trailer device comprised of few parts and that is simply constructed and that may be attached to a manually operated device as a tricycle, or velocipede.

A still further object of my invention consists in providing a simply constructed device that may be removably attached to a manually operated unit for the conveying of articles to be conveyed.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing.

Like reference characters refer to like parts throughout the several views.

Figure 1:
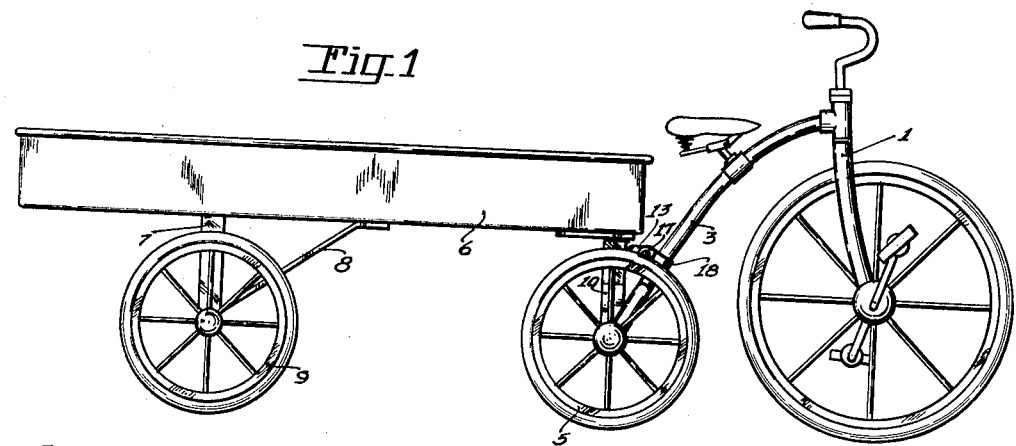
Fig 1 is a side view of the assembled device.
Figure 2:
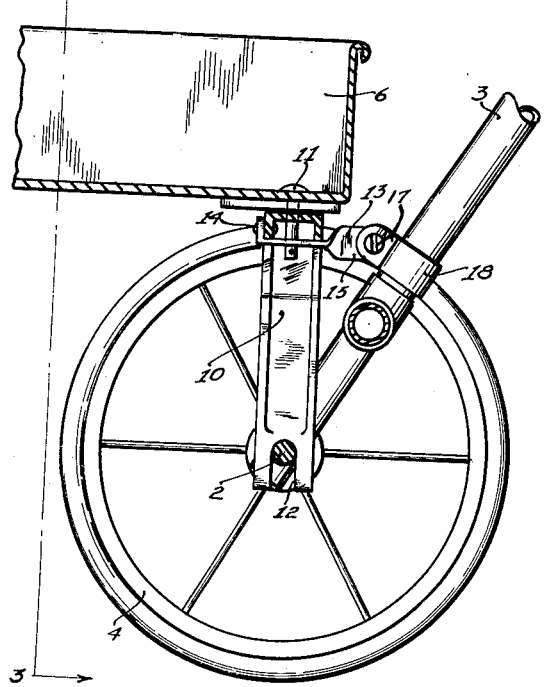
Fig 2 is a fragmentary sectional side view of the attaching end of the body of the trailer and of the rear wheel and the rear frame of the manually manipulated device that is to be ridden by the operator, illustrating the yoke and method of attaching the trailer to the assembly.
Figure 3:
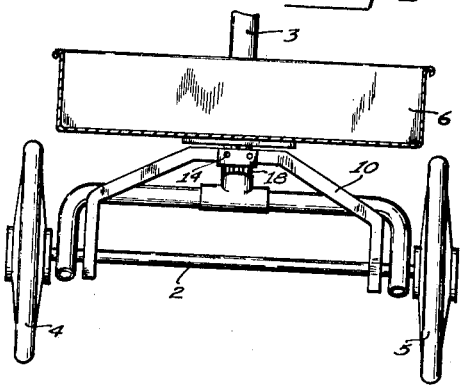
Fig 3 is a sectional end view of the mechanism illustrated in Fig 2. The same being taken on line 3—3 of Fig 2, looking in the direction indicated.
Figure 4:
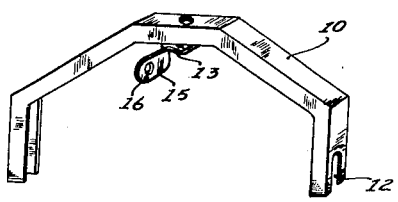
Fig 4 is a perspective, end view of the yoke that is adapted for being hingedly secured to the underside of the front end of the trailer and for resting directly upon the rear axle of the manually driven unit and for being secured to the frame of the vehicle.

My device is primarily adapted for being used in conjunction with a manually operated carrier, as a tricycle, or velocipede 1, that has a rear frame member 3. A pair of wheels 4 and 5 are adapted for being positioned upon the outer ends of the rear axle 2.

My device is primarily comprised of a bed 6 made of any suitable material. A bracket 7 downwardly extends from the bed body and is secured and rigidly maintained relative to the body by a strut 8. An axle is supported by the bracket 7 and the strut 8. A pair of wheels 9 are secured to the oppositely disposed ends of the axle. A bifurcated yoke 10 downwardly depends from the underside of the front end of the body 6 and is hingedly secured relative thereto by a king bolt 11. The lower ends of the yoke having slits 12 disposed therein to adapt the same for being secured directly upon the rear axle 2 of the unit that is to be ridden and to be manually propelled.

The yoke 10 is preferably made of a structural shape as a channel. A connecting link 13 is secured to the yoke by any suitable fastening means, as through the use of a connecting bolt or rivet 14. The same is so positioned and placed that the king bolt 11 passes centrally therethrough. The link 13 may be made of flat stock having a right angle formed in its rear end to adapt the same for being secured to the yoke by the fastening 14. A twist is placed in the forward end to form a vertically disposed surface 15 and a hole 16 is formed central of the free end of the link to adapt the same for being secured to a fastening 17.

A band 18 is adapted for being secured to the frame 3 of the vehicle, and the band 18 has a pair of ears terminating the same so that the link 13 may be placed therebetween. The ears of the band may be disposed upon the oppositely disposed side of the link and be secured thereto by the fastening 17. The link and the band form a rigid connection with the vehicle and acts as a saddle for supporting the bed of the trailer and for supporting the king bolt 11.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a pedally propelled vehicle, a trailer body, a bifurcated yoke having slitted ends resting upon and upwardly extending from the rear axle of the pedally propelled vehicle, a link fixedly secured to the central portion of the yoke and forwardly extending therefrom, a band secured to the rear frame of the vehicle and secured to the link by a removable fastening, and a king bolt connecting the yoke and the link to the underside of the bed of the trailer.

2. In combination with a tricycle, and a trailer body rearwardly supported by wheels; a bifurcated yoke having slotted ends adapted to rest upon and extend vertically upwards from the rear axle of the tricycle, a link fixedly secured to and extending forward from the central portion of the yoke, a band secured about the frame of the tricycle, means for detachably securing the link to the band, and means for rotatably securing the yoke to the trailer body.

JASON T. ANDERSON.